United States Patent
Ince et al.

(10) Patent No.: US 10,162,616 B2
(45) Date of Patent: Dec. 25, 2018

(54) SYSTEM FOR BINARY TRANSLATION VERSION PROTECTION

(71) Applicant: Intel Corporation, Santa Clara, CA (US)

(72) Inventors: Tugrul Ince, Santa Clara, CA (US); Koichi Yamada, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 14/752,440

(22) Filed: Jun. 26, 2015

(65) Prior Publication Data
US 2016/0378446 A1   Dec. 29, 2016

(51) Int. Cl.
| G06F 9/45 | (2006.01) |
| G06F 8/52 | (2018.01) |
| G06F 8/33 | (2018.01) |
| G06F 9/455 | (2018.01) |
| G06F 21/00 | (2013.01) |

(52) U.S. Cl.
CPC .......... *G06F 8/52* (2013.01); *G06F 8/33* (2013.01); *G06F 9/45516* (2013.01); *G06F 21/00* (2013.01)

(58) Field of Classification Search
CPC ........................................................ G06F 9/45
USPC .................................................. 717/136–141
See application file for complete search history.

(56) References Cited

U.S. PATENT DOCUMENTS

| 6,763,452 B1 * | 7/2004 | Hohensee ........... G06F 9/45554 703/22 |
| 9,703,726 B2 * | 7/2017 | Lutas .................... G06F 12/145 |
| 2002/0046305 A1 * | 4/2002 | Babaian ................ G06F 12/109 710/5 |

(Continued)

FOREIGN PATENT DOCUMENTS

| WO | 2014133520 A1 | 9/2014 |
| WO | 2014189510 A1 | 11/2014 |

OTHER PUBLICATIONS

Costa, et al., "Vigilante: End-to-end containment of internet worms," ACM SIGOPS Operating Systems Review, Vo. 39, No. 5, ACM, 2005, 15 pages.

(Continued)

*Primary Examiner* — Jae U Jeon
(74) *Attorney, Agent, or Firm* — Grossman, Tucker, Perreault & Pfleger, PLLC

(57) ABSTRACT

The present disclosure is directed to a system for binary translation version protection. Activity occurring in a device that may potentially cause native code to be altered may cause the device to prevent binary translations corresponding to the native code from being executed until a determination is made as to whether the binary translation needs to be regenerated. The native code may be stored in a memory page having an access permission that does not permit writes. Attempts to alter the native code would require the access permission of the memory page to be set to writable, which may cause a binary translation (BT) module to be notified of the potential change. The BT module may mark any binary translations corresponding to the native code as stale, and may cause a page permission control module to update memory pages including the binary translations to have an access permission of non-executable.

24 Claims, 5 Drawing Sheets

(56) References Cited

U.S. PATENT DOCUMENTS

| | | | | |
|---|---|---|---|---|
| 2002/0059268 A1* | 5/2002 | Babaian | ............... | G06F 9/45504 |
| 2004/0133884 A1* | 7/2004 | Zemach | ................... | G06F 8/52 |
| | | | | 717/138 |
| 2006/0047958 A1* | 3/2006 | Morais | ................... | G06F 21/51 |
| | | | | 713/166 |
| 2006/0259734 A1* | 11/2006 | Sheu | ................... | G06F 12/1036 |
| | | | | 711/203 |
| 2009/0204766 A1* | 8/2009 | Jacobi | ................ | G06F 12/0804 |
| | | | | 711/133 |
| 2010/0088474 A1* | 4/2010 | Agesen | ............... | G06F 9/45537 |
| | | | | 711/147 |
| 2011/0161620 A1* | 6/2011 | Kaminski | ........... | G06F 12/1009 |
| | | | | 711/207 |
| 2014/0025893 A1* | 1/2014 | Brown | ................ | G06F 9/30174 |
| | | | | 711/125 |
| 2014/0095832 A1* | 4/2014 | Haber | ....................... | G06F 8/52 |
| | | | | 712/205 |
| 2014/0229717 A1 | 8/2014 | Venkat et al. | | |
| 2015/0067763 A1 | 3/2015 | Dalcher et al. | | |
| 2015/0277914 A1* | 10/2015 | Kelm | ....................... | G06F 9/52 |
| | | | | 712/226 |

OTHER PUBLICATIONS

Cowan, et al., "StackGuard: Automatic Adaptive Detection and Prevention of Buffer-Overflow Attacks," Usenix Security, vol. 98, 1998, 16 pages.

Bruening, et al., "Maintaining consistency and bounding capacity of software code caches," Code Generation and Optimization, 2005, GCO, 2005, International Symposium on IEEE, 12 pages.

* cited by examiner

SYSTEM FOR BINARY TRANSLATION VERSION PROTECTION

TECHNICAL FIELD

The present disclosure relates to data processing, and more particularly, to a system that may recognize when native code changes for a binary translation and may update the translation.

BACKGROUND

Binary Translation (BT) is a technique that may be utilized to achieve instruction set architecture (ISA) compatibility of a binary without recompiling, increased performance through dynamic optimization, enforcement of security policy during execution, etc. A binary translator may generate translations from native code (e.g., a programming language used by a programmer to construct a program) and execute these translations instead of the native code. Otherwise the native code would need to be interpreted (e.g., translated line-by-line during execution), which may slow down the speed of data processing. While BT increases performance, it is important for BT systems to be faithful to how the original program is designed to execute. Therefore, BT systems strive to produce the same output as the native code. Translating native code into binary may also slow down system performance, so if native code may be executed more than once it may be beneficial to store a copy of the binary translation in a translation memory or "cache" so that the binary may be executed repeatedly without having to translate the native code each time.

Maintaining binary translations in a translation cache for frequently accessed translations is an effective technique to enhance the performance of a BT system. However, a mechanism is required to invalidate or update binary translations in the translation cache as the corresponding native code is modified (e.g., sometimes as the native code modifies itself in self-modifying or cross-modifying code). The code modifications may be caused by, for example, version updates and/or corrections (e.g., patches) to the code, code obfuscation (e.g., the inclusion of needless or roundabout references in the code that may change during execution to protect the code against hacking, reverse engineering, etc.), the unpacking of code, just-in-time compilation of code, etc. Whatever the reason, once native code is modified any binary translations that originated from the native code should be invalidated and updated as soon as native code changes. Moreover, a binary update operation may also involve timely notifications to any processing threads running the code to prevent the execution of binary translations no longer consistent with the native code.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
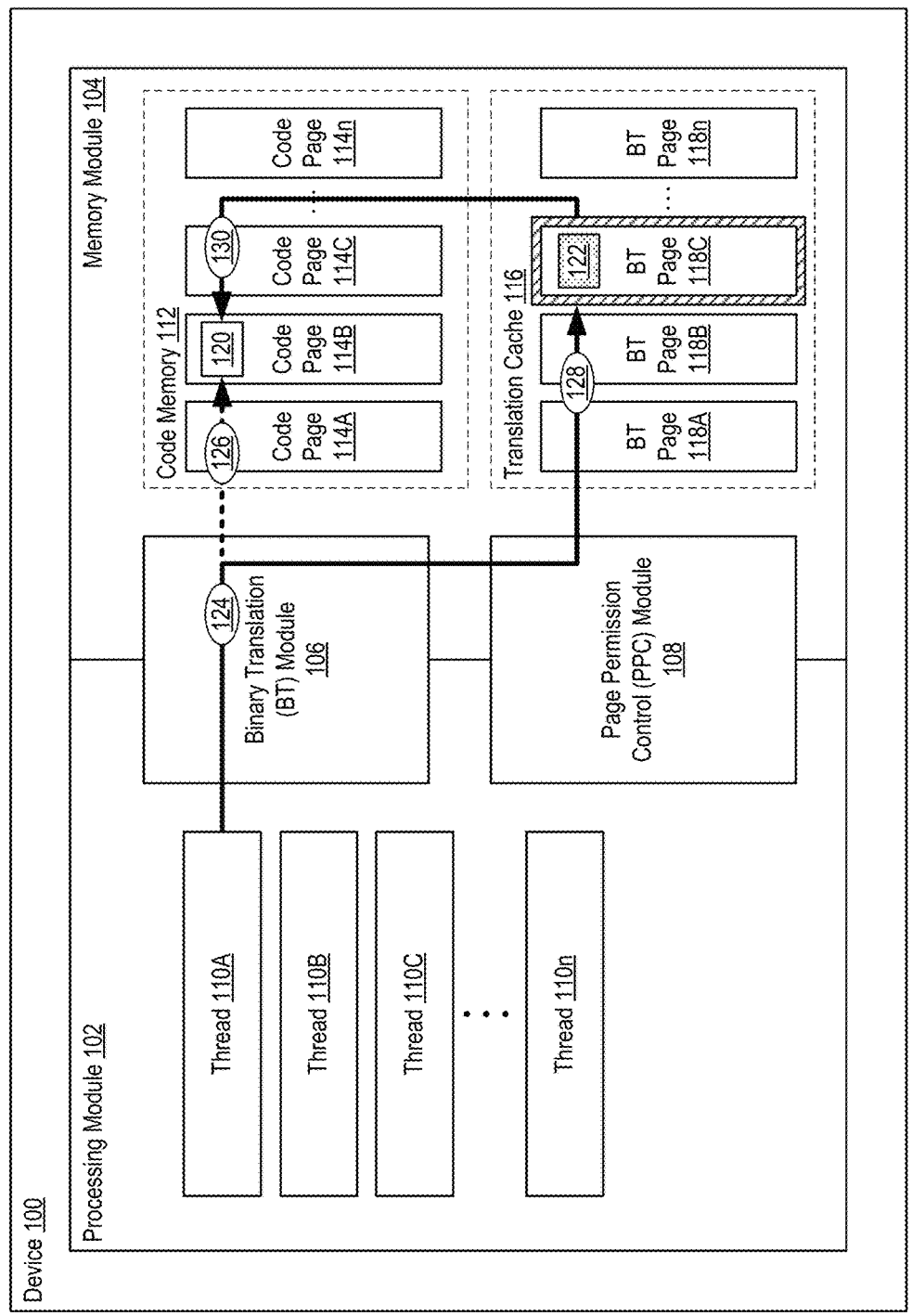
FIG. 1 illustrates an example device including a system for binary translation version protection in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a system for binary translation version protection. In general, activity occurring in a device that may potentially cause a program (e.g., native code) to be altered may cause the device to prevent binary translations corresponding to the native code from being executed until a determination is made as to whether the binary translation needs to be regenerated. For example, the native code may be stored in a memory page having an access permission that does not permit writes. Any attempt to alter the native code would require the access permission of the memory page to be set to writable, which may cause the BT module to be notified of the potential change. The BT module may then mark any binary translations that correspond to the native code as stale, and may further cause a page permission control (PPC) module to update memory pages including a binary translation corresponding to the native code to have an access permission of non-executable. Any attempt to execute the binary translation on these memory pages may generate access faults. After setting the access permission of the memory page comprising the native code to writable (e.g., to allow for updates to the native code), the BT module may then perform at least a recovery operation to consider whether the binary translations need to be updated. In at least one embodiment, the recovery operation may include determining a context of execution prior to the native code update, and utilizing the context to generate a binary translation that may continue from where the prior execution halted.

In at least one embodiment, an example device including a system for binary translation version protection may comprise at least a processing module, a memory module, a PPC module and a BT module. The processing module may be to process at least one thread. The memory module may include at least one code page to store native code and at least one translation page to store a binary translation of the native code. The PPC module may be to control an access permission for the at least one code page and the at least one translation page. The BT module may be to determine that the at least one thread is attempting to alter the native code and mark at least a portion of the binary translation as stale.

The at least one code page may comprise, for example, an access permission to prevent writes to the at least one code page. In determining that the at least one thread is potentially attempting to alter the native code, the BT module may be notified that the at least one thread has altered the access permission of the at least one code page to writable. The BT module may be to cause at least the page permission control module to change the permission of the at least one translation page to non-executable. The BT module may be to cause the page permission control module to change the access permission of the at least one code page to writable.

In the same or a different embodiment, the BT module may be to determine that at least one thread is attempting to execute at least the portion of the binary translation marked as stale after it is determined that the at least one thread is potentially attempting to alter the native code and perform recovery operations on at least the portion of the binary translation marked as stale prior to allowing the at least one thread to execute the binary translation. The at least one thread attempting to access the at least one translation page when the access permission is non-executable may cause an access fault. The access fault may cause the BT module to determine that the at least one thread is attempting to execute at least the portion of the binary translation marked as stale.

In performing the recovery operation the BT module may be to delete at least the portions of the binary translation marked as stale, cause the page permission control module to change the access permission of the at least one translation page to executable, determine whether execution may continue with the binary translation or if a new binary translation is required, if it is determined that the new binary translation is not required, dispatch execution to the binary translation, and if it is determined that a new binary translation is required, generate the new binary translation from the altered native code and dispatch execution to the new binary translation. In at least one embodiment, the BT module may further be to determine a context for the deleted portions of the binary translation and generate the new binary translation based also on the context. In determining a context the binary translation module may be to request a context from a state recovery module in the device and determine at least one instruction pointer in the context, the at least one instruction pointer being used to generate the new binary translation. Consistent with the present disclosure, a method for binary translation version protection may comprise determining that at least one processing thread in a device is attempting to potentially alter native code stored in at least one code page in the device and marking at least a portion of a binary translation corresponding to the native code to be altered as stale, wherein the binary translation is stored in at least one translation page in the device.

FIG. 1 illustrates an example device including a system for binary translation version protection in accordance with at least one embodiment of the present disclosure. Initially, the following may make reference to, or may use terminology commonly associated with, certain technologies for implementing access permissions on memory pages in a device to limit access to the contents of memory pages to only particular operations (e.g., read, write and/or execute). In at least one embodiment, access permissions may be implemented using hardware-enforced security features such as, for example, extended page table (EPT) functionality present in the certain microprocessors comprising virtualization technology (e.g., VT-x technology such as offered in microprocessors manufactured by the Intel Corporation). In another embodiment, a software-driven management system (e.g., NTDLL.dll in Windows operating systems from the Microsoft Corporation) may be employed to implement access permissions. These references have been employed herein merely for the sake of explanation, and are not intended to limit embodiments consistent with the present disclosure to any particular manner of implementation. While these example technologies provide a basis for understanding the embodiments, actual implementations may employ other similar technologies existing now or developed in the future.

The systems, teachings, etc. consistent with the present disclosure may be applicable to various applications such as, for example, self-modifying code (SMC) and/or cross-modifying code (XMC). An example of an application including SMC/XMC may be a web browser that self-adjusts to present different types of content by modifying existing code, loading new code (e.g., new versions of code or code extensions), etc. Existing mechanisms for synchronizing SMC/XMC events across multiple processor threads (e.g., multithreads) may depend highly on the timing for the other threads to enter the BT system and arrive at a translation consistency synchronization point (e.g., a point where execution of the binary translation is checked against execution of the native code for consistency) due to the lack of efficient real time asynchronous notification mechanism available for BT systems. In instances where correctness is required, the BT system may need to resort to a low performance solution such as, for example, generating a slow self-checking binary translation in which during execution the translation itself fetches and compares against execution of a copy of the native code that was made at the time of translation.

At least one problem in depending on multithreads to come to a synchronization point is that either the thread seeking to implement a change to the native code (e.g., sender) has to wait for a nondeterministic period for other threads to arrive at the synchronization point, which may severely impact system performance, or the other threads may already be executing stale binary translations before coming to the synchronization point. In another approach, some BT systems may attempt to identify and unlink all the loops inside binary and chained translations so that the other threads to come to the BT system for synchronization quickly. However, this solution is complex and may require a series of expensive unlink operations of the binary translations, therefore impacting the overall stability and performance.

Consistent with the present disclosure, a real-time notification of an SMC memory event may be provided to any affected processor threads at an application level without asking any new operating system support. This technique may also be applied to a co-designed system level BT system and may provide efficient synchronization mechanisms among multiple processors. The various embodiments may employ memory protection operations on at least a translation cache where binary translations are executed to prevent stale translations from being executed by any threads with minimum overhead.

In general, device 100 may be any apparatus that comprises resources configurable to at least receive a data input, process the data and generate an output. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Example device 100 may comprise at least processing module 102 and memory module 104. Example implementations of processing module 102 and memory module 104, as well as other modules that may exist in device 100, will be disclosed in regard to FIG. 2. In general, processing module 102 may comprise thread 110A, 110B, 110 C . . . 110n (collectively, "threads 110A . . . n"). Threads 110A . . . n, as referenced herein, may comprise sequences of programmatic instructions that may interact with resources in device 100 such as memory module 104. In this regard, threads 110A . . . n may share these resources such as memory and data in memory module 104. At least one thread (e.g., 110A) may be launched in processing module 102 when, for example, device 100 is initiated, a user of device 100 causes an application to be loaded, etc.

Memory module 104 may comprise at least code memory 112 and translation cache 116. In general, code memory 112 and translation cache 116 may reside in the same physical memory or separate physical memories configured to store data temporarily while device 100 is active. Code memory 112 may comprise at least one memory page, and in example illustrated in FIG. 1 comprises at least code page 114A, code page 114B, code page 114C . . . code page 114n (collectively, "code pages 114A . . . n"). Code pages 114A . . . n may comprise at least segments of native code that may, alone or in combination, form the basis for software in device 100 such as, for example, OS components, applications, programs, services, utilities, drivers, etc. Translation cache 116 may include at least one memory page (e.g., translation page), and in the example shown in FIG. 1 includes at least BT page 118A, BT page 118B, BT page 118C . . . BT page 118n (collectively, "BT pages 118A . . . n). BT pages 118 A . . . n may comprise binary translations corresponding to native code in code pages 114A . . . n. For example, as shown in FIG. 1 native code 120 in code page 114B may have a corresponding binary translation 122 in BT page 118C.

In at least one embodiment, portions of BT module 106 and PPC module 108 may reside in at least one of processing module 102 or memory module 104. BT module 106 may generally be to at least carry out the translation of native code 120 into at least one binary translation 122. PPC module 108 may be to at least configure access permissions for code pages 114A . . . n and BT pages 118A . . . n. Access permissions may control how data stored in code pages 114A . . . n and BT pages 118A . . . n may be accessed. Examples of access permissions may include, but are not limited to, read only (RO), read execute (RX), read write (R/W). Any page without execute permission is non-executable (NX). In view of the above, an attempt to alter native code 120 in code pages 114A . . . n that have an access permission that does not permit modification (e.g., RO or RX) will require the permission to be changed to writeable (e.g., R/W). This change may cause a notification to be generated (e.g., by PPC module 108 to BT module 106). Moreover, an attempt to execute binary translations in BT pages 118A . . . n that are NX (e.g., that do not have executable permission) may cause an access fault to be generated in device 100 to, for example, a virtual machine manager (VMM) such as a "hypervisor" or another high permission control and/or security system. The access fault may then be forwarded (e.g., by the hypervisor) to another system resource for handling such as, for example, BT module 106.

Consistent with the present disclosure, BT module 106 may also control how changes to native code 120 are handled, how execution of binary translation 122 based on the existing version of native code 120 is controlled, and how a new version of binary translation 122 is generated following a change to native code 120. In an example of operation, thread 110A may have a requirement to change (e.g., alter, update, expand, modify, unpack, etc.) native code 120. As shown at 124, thread 110A may attempt to write to code page 114B. The write activity of thread 110A may be to update native code 120 or may be related to other data stored on code page 114B, and thus, the activity of thread 110A at this point is considered as a "potential" update to native code 120. Consistent with the present disclosure, the attempt to write to code page 114B, as shown at 126, may cause BT module 106 to perform other actions before access to code page 114B is allowed. For example, BT module 106 may mark at least one binary translation 122 corresponding to native code 120 as "stale" as shown at 128. Marking binary translation 122 as stale may involve, for example, changing identification information in binary translation 122, changing an indicator associated within binary translation 122 (e.g., setting a stale bit), etc. Moreover, BT module 106 may cause PPC module 108 to change the access permission of BT page 118C from executable (e.g., RX) to NX. After the binary translation 122 is no longer able to be executed, BT module 106 may allow thread 110A to access code page 114B as shown at 130. While not shown in FIG. 1, subsequent attempts by threads 110A . . . n to execute binary translation 122 may generate access faults in device 100, which may cause BT module 106 to perform recovery operations on BT page 118C to, for example, determine whether binary translation 122 needs to be updated based on thread 110A altering native code 120. For example, if it turns out that thread 110A needed to access data in code page 114B other than native code 120, then binary translation 122 may not need to be updated. Following these recovery operations, BT page 118C may again be set to executable (e.g., RX).

Figure 2:
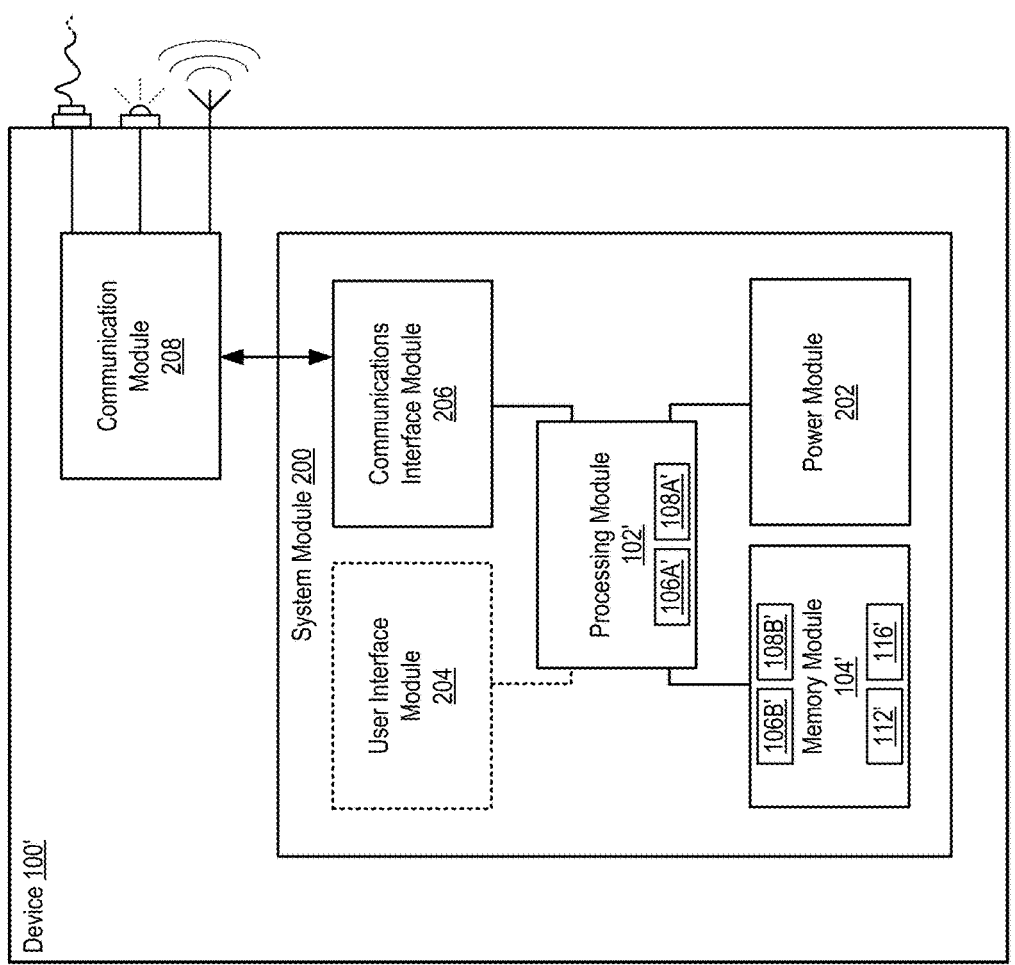
FIG. 2 illustrates an example configuration for a device usable in accordance with at least one embodiment of the present disclosure.

FIG. 2 illustrates an example configuration for a system usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation.

Device 100' may comprise, for example, system module 200 to manage operation of the device. System module 200 may include, for example, processing module 102', memory module 104', power module 202, user interface module 204 and communication interface module 206. Device 100' may further include communication module 208. While communication module 208 is illustrated as separate from system module 200, the example configuration shown in FIG. 2 has been provided herein merely for the sake of explanation.

Some or all of the functionality associated with communication module 208 may also be incorporated into system module 200.

In device 100', processing module 102' may comprise one or more processors situated in separate components, or alternatively one or more processing cores in a single component (e.g., in a system-on-chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 102' may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing module 102' may be configured to execute various instructions in device 100'. Instructions may include program code configured to cause processing module 102' to perform activities related to reading data, writing data, processing data, formulating data, converting data, transforming data, etc. Information (e.g., instructions, data, etc.) may be stored in memory module 104'. Memory module 104' may comprise random access memory (RAM) and/or read-only memory (ROM) in a fixed or removable format. RAM may include volatile memory configured to hold information during the operation of device 100' such as, for example, static RAM (SRAM) or dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 202 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 204 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 204 may be incorporated within device 100' and/or may be coupled to device 100' via a wired or wireless communication medium. User interface module 204 may be optional in certain circumstances such as, for example, a situation wherein device 100' is a server (e.g., rack server, blade server, etc.) that does not include user interface module 204, and instead relies on another device (e.g., a management terminal) for user interface functionality.

Communication interface module 206 may be configured to manage packet routing and other control functions for communication module 208, which may include resources configured to support wired and/or wireless communications. In some instances, device 100' may comprise more than one communication module 208 (e.g., including separate physical interface modules for wired protocols and/or wireless radios) managed by a centralized communication interface module 206. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound or light waves, etc. In one embodiment, communication interface module 206 may be configured to prevent wireless communications that are active in communication module 208 from interfering with each other. In performing this function, communication interface module 206 may schedule activities for communication module 208 based on, for example, the relative priority of messages awaiting transmission. While the embodiment disclosed in FIG. 2 illustrates communication interface module 206 being separate from communication module 208, it may also be possible for the functionality of communication interface module 206 and communication module 208 to be incorporated into the same module.

Consistent with the present disclosure, at least part of BT module 106 and PPC module 108 may be situated in processing module 102' and/or memory module 116'. For example, BT module 106A' and PPC module 108A' may comprise code executed by processing module 102', wherein at least a portion of the code may be stored in memory module 104' as shown at 106B' and 108B'. Moreover code memory 112' and/or translation cache 116' may reside in memory module 104' (e.g., in a volatile memory like RAM that may lose its contents when device 100' is powered down, rebooted, etc.). In an example of operation, BT module 106A' may cause processing module 102' to determine that the at least one thread 110A . . . n in processing module 102' is potentially attempting to alter native code 120 stored in code memory 112' and also to mark at least a portion of binary translation 122 stored in translation cache 116' as stale. Moreover, BT module 106A' may also be configured to cause processing module 102' to control PPC module 108A' to cause the access permission of at least one BT page 118A . . . n to be changed to non-executable (NX) to prevent a stale binary translation 122 from being executed (e.g., by another thread).

Figure 3:
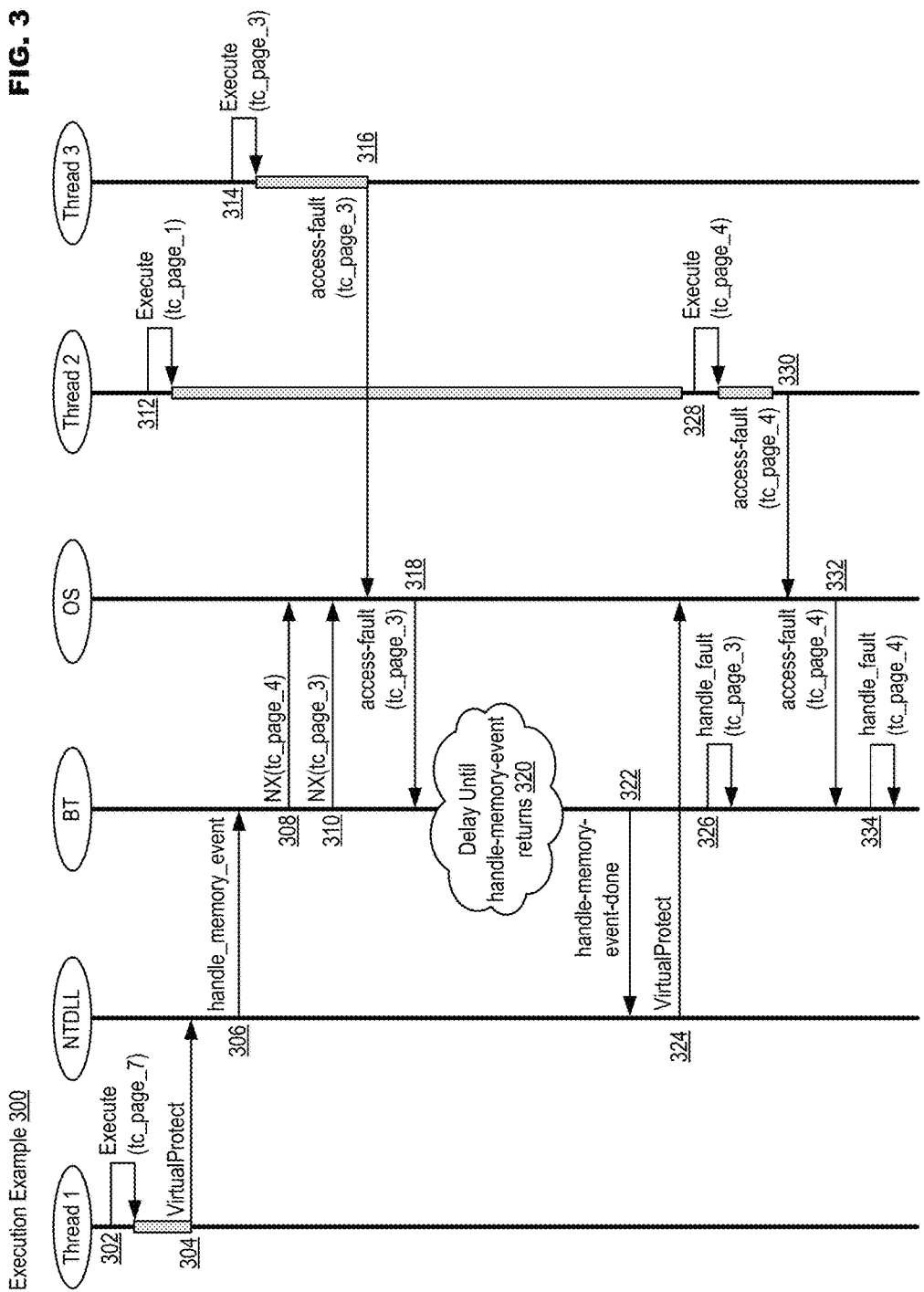
FIG. 3 illustrates example interactions that may occur during binary translation version protection in accordance with at least one embodiment of the present disclosure.

FIG. 3 illustrates example interactions that may occur during binary translation version protection in accordance with at least one embodiment of the present disclosure. Example 300 illustrates interactions that may occur within a device between an example thread attempting to change native code (e.g., thread 1), the NTDLL (e.g., which exports the Windows OS native application program interface (API)

for interacting with user-mode components of the OS), the binary translation module (BT), the operating system of the device (OS) and two other example threads (thread 2 and thread 3) that may attempt to execute binary translations of the native code.

As illustrated in FIG. 3, thread 1 may execute instructions that involve modifying native code (e.g., Execute tc_page_7 as shown at 302). When the instructions prepare for alterations to the native code, a call to VirtualProtect may take place to change permissions of the code page including the native code as shown at 304. In at least one embodiment, code pages may by default have access permissions that do not allow the contents of the native code pages to be modified (e.g., RO or RX) and hence have to be converted to writable (e.g. RW). In at least one embodiment, the BT module may insert "hooks" (e.g., programmatic links) into the well-known NTDLL functions to direct execution to the BT module as shown at 306.

Upon being notified of the attempt to change the page permission via the NTDLL, the BT module may cause the access permissions of pages that contain binary translations corresponding to the native code that is being changed to be non-executable (NX) including tc_page_4 as shown at 308 and tc_page_3 as shown at 310. In at least one embodiment, access permission may be changed by transmitting instructions to the OS which may include the PPC module or at least an API to control the PPC module. While this is occurring, thread 2 and thread 3 may execute instructions that will execute binary translations in tc_page_1 as shown at 312 and tc_page_3 as shown at 314. The execution of tc_page_1 will not cause an access fault since tc_page_1 is not related to the native code in tc_page_7, and thus, tc_page_1 has an access permission of executable. However, when thread 3 attempts to execute a binary translation in tc_page_3, an access fault (e.g., nx_fault) is caused as shown at 316, the access fault being passed by the OS to the BT module as shown at 318. The BT module may then delay until all stale translations are identified (e.g., until a handle_memory_event is returned at 320). At this point in example 300 the native code stored in tc_page_7 may comprise the modifications that were originally requested by thread 1 at 302. BT module 322 may then inform the NTDLL that the code page is now ready to be converted to another page permission (e.g., such as RW) as shown at 324.

In at least one embodiment, access faults that are generated by attempts to execute binary translations on translation pages are noted but not acted on until both access permission for the code page has been completed and another thread attempts to execute the binary translation. In example 300, thread 3 had already attempted to execute the binary translation in tc_page_3 at 316, so at 326 recovery operations may be performed to update the binary code in view of the modified native code. At a later time thread 2 attempts to execute the binary code in tc_page_4 as shown at 328. Since this is the first time that tc_page_4 is being accessed, the access permission for tc_page_4 is still NX, which causes an access fault (e.g., nx_fault) to be passed by the OS to the BT module as shown at 330 and 332. BT module may then perform recovery operations on tc_page_4 to update the binary translation in tc_page_4 to reflect the modified native code as shown at 334.

Figure 4:
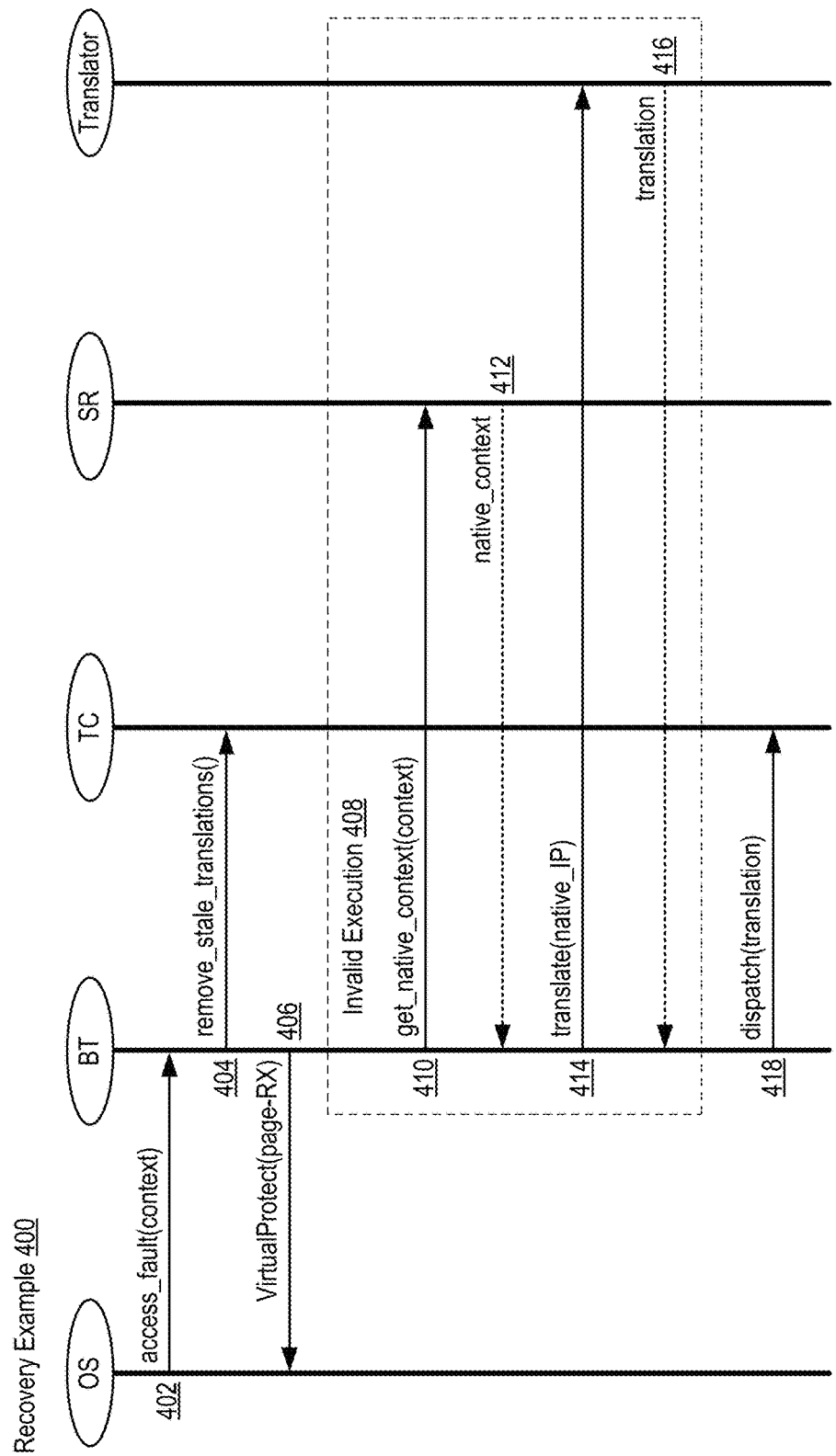
FIG. 4 illustrates example interactions that may occur during binary translation recovery in accordance with at least one embodiment of the present disclosure.

FIG. 4 illustrates example interactions that may occur during binary translation recovery in accordance with at least one embodiment of the present disclosure. Example 400 illustrates interactions that may occur corresponding to the recovery operations that were described, for example, in regard to 326 and 334 in example 300. In example 400, the OS may interact with the BT module (BT), the translation cache (TC), a state recovery module (SR) and a translator.

The OS may initially provide an access fault (e.g., nx_fault) to the BT module as shown at 402. The access fault may include a context of execution. The context may be the state of the binary translation that is being recovered in recovery process 400 at the instant that the access fault occurred including, for example, the instruction that was being performed, the state of variables, registers, etc. In at least one embodiment, the BT module may first check to see if the address that caused the fault lies within a translation page and if the fault is due to an attempt to access a translation page that has an access permission set to non-executable (NX). If the fault occurred within a translation page that is set to NX, then at 404 binary translations marked as stale may be removed from the translation page, and the access permission of the translation page may be returned to executable as shown at 406. Any unaffected binary translations may resume execution from where execution was halted due to the change in access permission.

Invalid execution operations 408 may pertain to a certain scenario. In some instances, a binary translation that was executed right before an access fault occurred may also be considered stale and may get removed. This may occur when the binary translation was also generated from a native code page that is being converted to writable (e.g., R/W), and hence considered to be stale. To continue execution, the BT module may recover the native context of the application and create a new binary translation from this native state. As shown in example 400, the BT module may send a get_native_context request including the context provided by the OS to the state recovery module at 410. Consistent with the present disclosure, the state recovery module may include at least a register, table or other type of memory structure that tracks the progress of binary translation execution in the device, and may be able to provide a native context including at least instruction pointers (IP) corresponding to where in the native code the execution of the binary translation stopped as shown at 412. The BT module may then request that the translator retranslate the native code into a binary translation based on at least on the instructions pointers as shown at 414, and may then receive the translation at 416. The BT module may then dispatch the translation to the translation cache as shown at 418 (e.g., to resume program execution).

Figure 5:
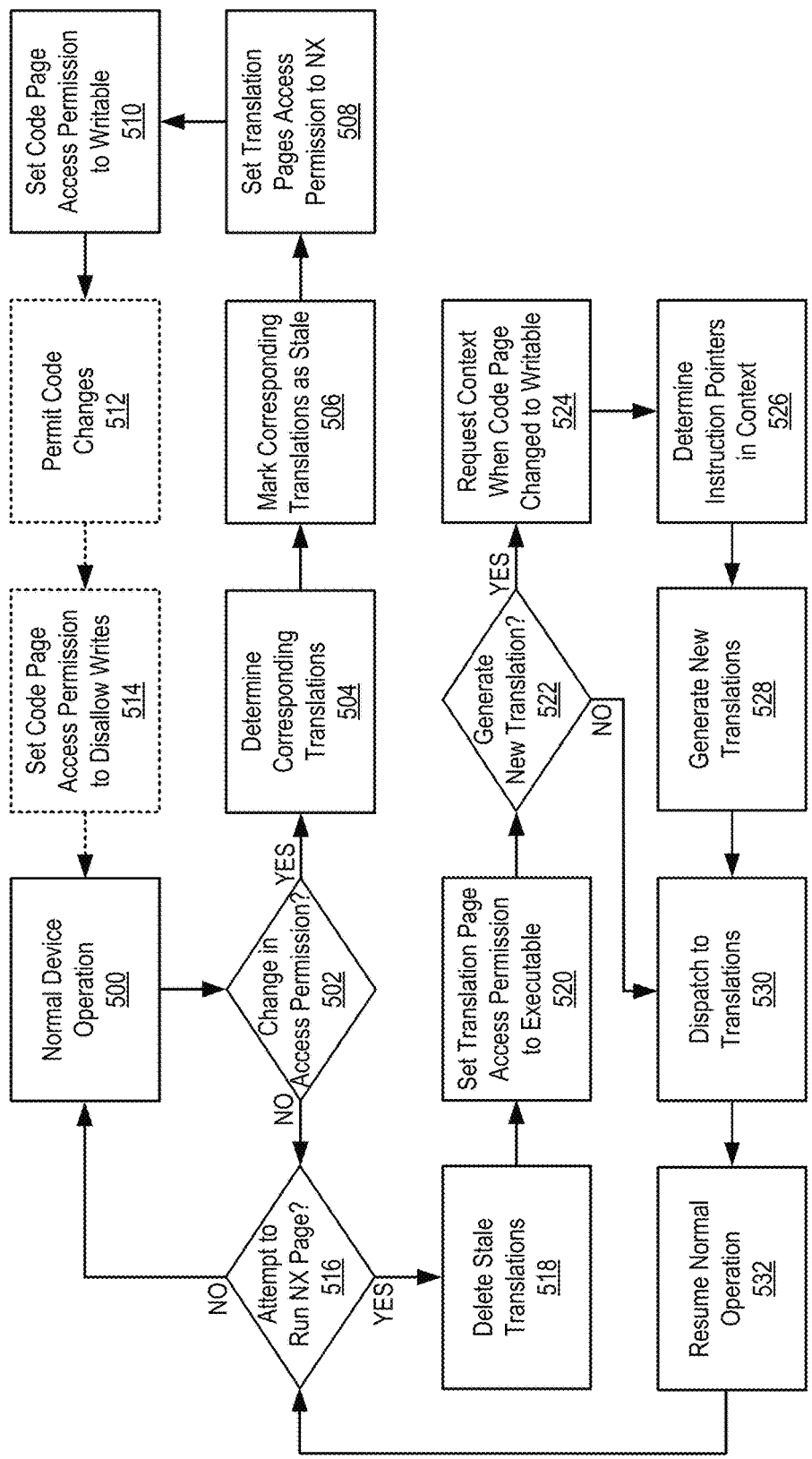
FIG. 5 illustrates example operations for binary translation version protection in accordance with at least one embodiment of the present disclosure.

FIG. 5 illustrates example operations for binary translation version protection in accordance with at least one embodiment of the present disclosure. Normal device operation in operation 500 may be followed by a determination in operation 502 as to whether there has been an attempt to change access permission for a code page (e.g., to potentially alter native code in the code page). In operation 504, binary translations corresponding to the potential native code change may be determined, and in operation 506 the corresponding binary translations may be marked as stale. The status of the translation pages in which the binary translations marked as stale are stored may then be changed to non-executable (NX) in operation 508.

In operation 510 the access permission of a code page containing native code that may potentially be updated may be changed to allow modification of the native code (e.g., writable). Operations 512 to 514 may be optional in that they may only occur when a potential code change is realized to be an actual change to native code. Changes to the native code may be permitted in operation 512, and the access permission of the code page may then be changed back to disallow writes to the native code (e.g., to RX or RO) in operation 514. Operation 514 may be followed by a return to operation 500 to resume normal device operation.

Following a determination in operation 502 that no change in access permissions have been monitored, in operation 516 a further determination may be made as to whether a thread has attempted to execute a binary translation in a translation page having an access permission of NX (e.g., whether a thread tried to execute a stale binary translation). A determination in operation 516 that no attempts were made to execute stale binaries may be followed by a return to operation 500 to resume normal device operation.

If in operation 516 it is determined that an attempt was made to execute a stale binary translation, then in operations 518 to 528 recovery of stale binary translations may occur. In operation 518 the stale binary translations may be deleted from the translation page. In operation 520 the access permission for the translation page may be returned to executable (e.g., RX). A determination may be made in operation 522 as to whether to generate new binary translations. For example, the determination in operation 522 may be based on whether binary translations executed prior to the access fault were deemed invalid, and thus, that new binary translations should be generated. If in operation 522 a determination is made that new binary translations should be generated, then in operation 524 a request may be made to determine the context of the binary translation when the native code page was changed to be writable (e.g., to R/W). In operation 526 at least one instruction pointer may be determined based on the returned context, which may be followed by operation 528 wherein at least one new binary translation may be generated based on the new native code and the instruction pointers. Once the binary translation is generated, execution may be dispatched to the new binary translation (e.g., execution of larger program of which the binary translation is a part may resume) in operation 530, and in operation 532 normal operation may resume, which may be followed by a return to operation 516 to determine whether recovery operations are required for any other non-executable (NX) translation pages. Returning to operation 522, if it is determined that a new binary translation should not be generated (e.g., that there were no prior code executions that were invalidated by the access fault), then in operation 530 execution may be dispatched to the existing binary translation that was used prior to the access fault (e.g., so that the prior execution may resume where it left off), and in operation 528 normal operation may resume as described above.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a system for binary translation version protection. Activity occurring in a device that may potentially cause native code to be altered may cause the device to prevent binary translations corresponding to the native code from being executed until a determination is made as to whether the binary translation needs to be regenerated. The native code may be stored in a memory page having an access permission that does not permit writes. Attempts to alter the native code would require the access permission of the memory page to be set to writable, which may cause a binary translation (BT) module to be notified of the potential change. The BT module may mark any binary translations corresponding to the native code as stale, and may cause a page permission control module to update memory pages including the binary translations to have an access permission of non-executable.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for binary translation version protection.

According to example 1 there is provided a device for binary translation version protection. The device may comprise a processing module to process at least one thread, a memory module including at least one code page to store native code and at least one translation page to store a binary translation of the native code, a page permission control module to control an access permission for the at least one code page and the at least one translation page; and a binary translation module to determine that the at least one thread is potentially attempting to alter the native code and mark at least a portion of the binary translation as stale.

Example 2 may include the elements of example 1, wherein the page permission control module is implemented using Extended Page Table hardware-enforced security technology.

Example 3 may include the elements of any of examples 1 to 2, wherein the at least one code page and the at least one translation page are stored in volatile memory in the memory module.

Example 4 may include the elements of any of examples 1 to 3, wherein the at least one code page comprises an access permission to prevent writes to the at least one code page.

Example 5 may include the elements of example 4, wherein in determining that the at least one thread is potentially attempting to alter the native code, the binary translation module is to be notified that the at least one thread has altered the access permission of the at least one code page to writable.

Example 6 may include the elements of any of examples 1 to 5, wherein the binary translation module is to cause at least the page permission control module to change the permission of the at least one translation page to non-executable.

Example 7 may include the elements of example 6, wherein the binary translation module is to cause at least the page permission control module to change the access permission of the at least one code page to writable.

Example 8 may include the elements of any of examples 1 to 7, wherein the binary translation module is to determine that at least one thread is attempting to execute at least the portion of the binary translation marked as stale after it is determined that the at least one thread is potentially attempting to alter the native code and perform recovery operations on at least the portion of the binary translation marked as stale prior to allowing the at least one thread to execute the binary translation.

Example 9 may include the elements of example 8, wherein the at least one thread attempting to access the at least one translation page when the access permission is non-executable causes an access fault.

Example 10 may include the elements of example 9, wherein the access fault causes the binary translation module to determine that the at least one thread is attempting to execute at least the portion of the binary translation marked as stale.

Example 11 may include the elements of any of examples 8 to 10, wherein the binary translation module is to delay prior to performing recovery operations to allow a write operation to the at least one code page to complete.

Example 12 may include the elements of any of examples 8 to 11, wherein in performing the recovery operation the binary translation module is to delete at least the portions of the binary translation marked as stale, cause at least the page permission control module to change the access permission of the at least one translation page to executable, determine whether execution may continue with the binary translation or if a new binary translation is required, if it is determined that the new binary translation is not required, dispatch execution to the binary translation and if it is determined that a new binary translation is required, generate the new binary translation from the altered native code and dispatch execution to the new binary translation.

Example 13 may include the elements of example 12, wherein in determining whether execution may continue with the binary translation or if a new binary translation is required the binary translation module is to determine whether at least one binary translation executed prior to the access fault is invalid.

Example 14 may include the elements of any of examples 12 to 13, wherein the binary translation module is to determine a context for the deleted portions of the binary translation and generate the new binary translation based also on the context.

Example 15 may include the elements of example 14, wherein in determining a context the binary translation module is to request a context from a state recovery module in the device and determine at least one instruction pointer in the context, the at least one instruction pointer being used to generate the new binary translation.

Example 16 may include the elements of any of examples 1 to 15, wherein the at least one code page comprises an access permission to prevent writes to the at least one code page and, in determining that the at least one thread is potentially attempting to alter the native code, the binary translation module is to be notified that the at least one thread has altered the access permission of the at least one code page to writable.

Example 17 may include the elements of any of examples 1 to 16, wherein the binary translation module is to cause at least the page permission control module to change the permission of the at least one translation page to non-executable and cause at least the page permission control module to change the access permission of the at least one code page to writable.

According to example 18 there is provided a method for binary translation version protection. The method may comprise determining that at least one processing thread in a device is potentially attempting to alter native code stored in at least one code page in the device and marking at least a portion of a binary translation corresponding to the native code to be altered as stale, wherein the binary translation is stored in at least one translation page in the device.

Example 19 may include the elements of example 18, wherein determining that the at least one processing thread in the device is attempting to alter the native code comprises being notified that the at least one thread has altered an access permission of the at least one code page to writable from an access permission set to prevent writes.

Example 20 may include the elements of any of examples 18 to 19, and may further comprise causing an access permission of the at least one translation page to be changed to non-executable.

Example 21 may include the elements of example 20, and may further comprise causing an access permission of the at least one code page to be changed to writable.

Example 22 may include the elements of example 21, and may further comprise delaying to allow a write operation to the at least one code page to complete.

Example 23 may include the elements of any of examples 20 to 22, and may further comprise determining that at least one processing thread in the device is attempting to execute at least the portion of the binary translation marked as stale based on an access fault caused by the at least one processing thread attempting to access the at least one translation page when the access permission is non-executable.

Example 24 may include the elements of any of examples 20 to 23, and may further comprise deleting at least the portions of the binary translation marked as stale, causing the access permission of the at least one translation page to be changed to executable, determining whether execution may continue with the binary translation or if a new binary translation is required, if it is determined that the new binary translation is not required, dispatching execution to the binary translation, and if it is determined that a new binary translation is required, generating the new binary translation from the altered native code and dispatching execution to the new binary translation.

Example 25 may include the elements of example 24, wherein determining whether execution may continue with the binary translation or if a new binary translation is required comprises determining whether at least one binary translation executed prior to the access fault is invalid.

Example 26 may include the elements of example 25, and may further comprise determining a context for the deleted portions of the binary translation and generating the new binary translation based also on the context.

Example 27 may include the elements of example 26, wherein determining a context comprises requesting a context from a state recovery module in the device and determining at least one instruction pointer in the context, the at least one instruction pointer being used to generate the new binary translation.

Example 28 may include the elements of any of examples 18 to 27, and may further comprise causing an access permission of the at least one translation page to be changed to non-executable and causing an access permission of the at least one code page to be changed to writable.

According to example 29 there is provided a system including at least a device, the system being arranged to perform the method of any of the above examples 18 to 28.

According to example 30 there is provided a chipset arranged to perform the method of any of the above examples 18 to 28.

According to example 31 there is provided at least one machine readable medium comprising a plurality of instructions that, in response to be being executed on a computing device, cause the computing device to carry out the method according to any of the above examples 18 to 28.

According to example 32 there is provided a device configured for binary translation version protection, the device being arranged to perform the method of any of the above examples 18 to 28.

According to example 33 there is provided a system for binary translation version protection. The system may comprise means for determining that at least one processing thread in a device is attempting to alter native code stored in at least one code page in the device and means for marking at least a portion of a binary translation corresponding to the native code to be altered as stale, wherein the binary translation is stored in at least one translation page in the device.

Example 34 may include the elements of example 33, wherein the means for determining that the at least one processing thread in the device is attempting to alter the native code comprise means for being notified that the at least one thread has altered an access permission of the at least one code page to writable from an access permission set to prevent writes.

Example 35 may include the elements of any of examples 33 to 34, and may further comprise means for causing an access permission of the at least one translation page to be changed to non-executable.

Example 36 may include the elements of example 35, and may further comprise means for causing an access permission of the at least one code page to be changed to writable.

Example 37 may include the elements of example 36, and may further comprise means for delaying to allow a write operation to the at least one code page to complete.

Example 38 may include the elements of any of examples 35 to 37, and may further comprise means for determining that at least one processing thread in the device is attempting to execute at least the portion of the binary translation marked as stale based on an access fault caused by the at least one processing thread attempting to access the at least one translation page when the access permission is non-executable.

Example 39 may include the elements of any of examples 35 to 38, and may further comprise means for deleting at least the portions of the binary translation marked as stale, means for causing the access permission of the at least one translation page to be changed to executable, means for determining whether execution may continue with the binary translation or if a new binary translation is required, means for, if it is determined that the new binary translation is not required, dispatching execution to the binary translation and means for, if it is determined that a new binary translation is required, generating the new binary translation from the altered native code and dispatch execution to the new binary translation.

Example 40 may include the elements of example 39, wherein the means for determining whether execution may continue with the binary translation or if a new binary translation is required comprise means for determining whether at least one binary translation executed prior to the access fault is invalid.

Example 41 may include the elements of any of examples 39 to 40, and may further comprise means for determining a context for the deleted portions of the binary translation and means for generating the new binary translation based also on the context.

Example 42 may include the elements of example 41, wherein the means for determining a context comprises means for requesting a context from a state recovery module in the device; and means for determining at least one instruction pointer in the context, the at least one instruction pointer being used to generate the new binary translation.

Example 43 may include the elements of any of examples 33 to 42, and may further comprise causing an access permission of the at least one translation page to be changed to non-executable and causing an access permission of the at least one code page to be changed to writable.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device including a system for binary translation version protection, comprising:

processing circuitry to process at least one thread;
memory circuitry including code pages to store native code and translation pages to store binary translation of the native code;
page permission control circuitry to control an access permission for a first code page and a first translation page; and
binary translation circuitry to:
  determine that a first thread is attempting to alternative code stored in the first code page; and
  responsive to a determination that the first thread is attempting to alter the native code stored in the first code page:
    mark as stale at least a first translation page, wherein the first translation page stores both a first portion of binary translation that corresponds to the stored native code to be altered and a second portion of the binary translation that does not correspond to the stored native code to be altered;
    responsive to an attempt by a second thread to execute a portion of the binary translation stored in the first translation page marked as stale, determine whether the second thread is attempting to execute the first portion of the binary translation that corresponds to the stored native code to be altered; and
    responsive to a determination that the second thread is attempting to execute the first portion of the binary translation that corresponds to the stored native code to be altered, prevent execution of the first portion of the binary translation until one or more recovery operations are performed on at least the first portion of the binary translation, and otherwise allow execution of the second portion of the binary translation that is stored by the first translation page but that does not correspond to the stored portion of the native code to be altered.

2. The device of claim 1, wherein the first code page comprises an access permission to prevent writes to the at least one code page.

3. The device of claim 2, wherein to determine that the first thread is attempting to alter the native code stored in the first page includes to receive a notification that the first thread has altered the access permission of the first code page to writable.

4. The device of claim 1, wherein the binary translation circuitry is further to cause the page permission control circuitry to change the permission of the first translation page to non-executable.

5. The device of claim 4, wherein the binary translation circuitry is further to cause the page permission control circuitry to change the access permission of the first code page to writable.

6. The device of claim 1, wherein the first thread attempting to access the first translation page when the access permission is non-executable causes an access fault.

7. The device of claim 6, wherein the access fault causes the binary translation circuitry to determine that the second thread is attempting to execute the first portion of the binary translation.

8. The device of claim 1, wherein the binary translation circuitry is further to:
  delete the first portion of the binary translation;
  cause the page permission control circuitry to change the access permission of the first translation page to executable;
  determine whether execution may continue with the binary translation or if a new binary translation is required;
  if it is determined that the new binary translation is not required, dispatch execution to the binary translation; and
  if it is determined that a new binary translation is required, generate the new binary translation based on the altered native code and dispatch execution to the new binary translation.

9. The device of claim 8, wherein the binary translation circuitry is further to:
  determine a context for the deleted first portion of the binary translation; and
  generate the new binary translation further based on the context.

10. The device of claim 9, wherein to determine a context includes to:
  request a context from a state recovery circuitry in the device; and
  determine at least one instruction pointer in the context, the at least one instruction pointer being used to generate the new binary translation.

11. A method for binary translation version protection, comprising:
  determining that a first processing thread in a device is attempting to alternative code stored in at least one code page in the device;
  responsive to the determining that the first processing thread is attempting to alter the native code stored in the at least one code page, marking as stale at least one translation page in the device, the at least one translation page storing both a first portion of binary translation that corresponds to the native code to be altered and a second portion of the binary translation that does not correspond to the stored native code to be altered;
  responsive to an attempt by a second processing thread to execute a portion of binary translation stored in the at least one translation page marked as stale, determining whether the second processing thread is attempting to execute the first portion of the binary translation that corresponds to the stored native code to be altered; and
  responsive to determining that the second processing thread is attempting to execute the first portion of the binary translation that corresponds to the stored native code to be altered, preventing execution of the first portion of the binary translation until one or more recovery operations are performed on at least the first portion of the binary translation, and otherwise allowing execution of the second portion of the binary translation that is stored by the at least one translation page but that does not correspond to the portion of the native code to be altered.

12. The method of claim 11, wherein determining that the first processing thread in the device is attempting to alter the stored native code comprises being notified that the at least one thread has altered an access permission of the at least one code page to writable from an access permission set to prevent writes.

13. The method of claim 11, further comprising:
  causing an access permission of the at least one translation page to be changed to non-executable.

14. The method of claim 13, further comprising:
  causing an access permission of the at least one code page to be changed to writable.

15. The method of claim 13, wherein:
the determining that the second processing thread in the device is attempting to execute the first portion of the binary translation that corresponds to the stored native code to be altered is based at least in part on an access fault caused by the second processing thread attempting to access the at least one translation page when the access permission is non-executable.

16. The method of claim 13, further comprising:
deleting at least the first portion of the binary translation;
causing the access permission of the at least one translation page to be changed to executable;
determining whether execution may continue with the binary translation or if a new binary translation is required;
if it is determined that the new binary translation is not required, dispatching execution to the binary translation; and
if it is determined that a new binary translation is required, generating the new binary translation from the altered native code and dispatching execution to the new binary translation.

17. The method of claim 16, further comprising:
determining a context for the deleted first portion of the binary translation; and
generating the new binary translation based also on the context.

18. At least one non-transitory machine-readable storage device having stored thereon, individually or in combination, instructions for binary translation version protection that, when executed by one or more processors, cause the one or more processors to:
determine that a first processing thread in a device is attempting to alternative code stored in at least one code page in the device;
responsive to a determination that the first processing thread is attempting to alter the native code stored in the at least one code page, mark as stale at least one translation page in the device, the at least one translation page storing both a first portion of binary translation that corresponds to the stored native code to be altered and a second portion of the binary translation that does not correspond to the stored native code to be altered;
responsive to an attempt by a second processing thread to execute a portion of the binary translation stored in the at least one translation page marked as stale, determine whether the second processing thread is attempting to execute the first portion of the binary translation that corresponds to the stored native code to be altered; and
responsive to a determination that the second processing thread is attempting to execute the first portion of the binary translation that corresponds to the stored native code to be altered, prevent execution of the first portion of the binary translation until one or more recovery operations are performed on at least the first portion of the binary translation, and otherwise allowing execution of the second portion of the binary translation that is stored by the at least one translation page but that does not correspond to the stored portion of the native code to be altered.

19. The storage device of claim 18, wherein to determine that the first processing thread is attempting to alter the stored native code includes to receive a notification that the first processing thread has altered an access permission of the at least one code page to writable from an access permission set to prevent writes.

20. The storage device of claim 18, further comprising instructions that, when executed by the one or more processors, cause the one or more processors to:
cause an access permission of the at least one translation page to be changed to non-executable.

21. The storage device of claim 20, further comprising instructions that, when executed by the one or more processors, cause the one or more processors to:
cause an access permission of the at least one code page to be changed to writable.

22. The storage device of claim 20, wherein to determine that the second processing thread in the device is attempting to execute the first portion of the binary translation that corresponds to the native code to be altered is based at least in part on an access fault caused by the second processing thread attempting to access the at least one translation page when the access permission is non-executable.

23. The storage device of claim 20, further comprising instructions that, when executed by the one or more processors, cause the one or more processors to:
delete at least the first portion of the binary translation;
cause the access permission of the at least one translation page to be changed to executable;
determine whether execution may continue with the binary translation or if a new binary translation is required;
if it is determined that the new binary translation is not required, dispatch execution to the binary translation; and
if it is determined that a new binary translation is required, generate the new binary translation from the altered native code and dispatch execution to the new binary translation.

24. The storage device of claim 23, further comprising instructions that, when executed by the one or more processors, cause the one or more processors to:
determine a context for the deleted first portion of the binary translation; and
generate the new binary translation based also on the context.

* * * * *